United States Patent [19]

Hayden

[11] 4,145,488

[45] Mar. 20, 1979

[54] FIRE RETARDANT POLYURETHANE FOAMS

[75] Inventor: David E. Hayden, Newark, Ohio

[73] Assignee: Owens-Corning Fiberglas Corporation, Toledo, Ohio

[21] Appl. No.: 796,106

[22] Filed: May 12, 1977

[51] Int. Cl.$^2$ .................. C08G 18/14; C08G 18/48
[52] U.S. Cl. ......................... 521/177; 427/385 C; 427/373; 428/425; 521/126; 521/167; 521/906
[58] Field of Search .................. 260/2.5 AQ, 2.5 AN, 260/2.5 AP, DIG. 24, 2.5 AV; 521/177

[56] References Cited

U.S. PATENT DOCUMENTS

| | | | |
|---|---|---|---|
| 3,091,551 | 5/1963 | Robertson | 260/2.5 AQ |
| 3,585,185 | 6/1971 | Levis et al. | 260/2.5 AQ |
| 3,795,637 | 3/1974 | Kandler et al. | 260/DIG. 24 |
| 3,943,077 | 3/1976 | Bell et al. | 260/2.5 AQ |
| 3,994,839 | 11/1976 | Cenker et al. | 260/2.5 AV |

OTHER PUBLICATIONS

Pluracol PeP Tetrols, Urethane Grade, PeP 450, 550, 650, BASF Wyandotte Corp., Wyandotte, Michigan, (Bulletin U-38), no date.
Pluracol FS-529 Polyol, BASF Wyandotte Corp., (Bulletin U-08), Dec. 30, 1970.
Product Data-Rigid Polyol-Thanol R-650-X, Jefferson Chemical Co., Houston, Texas, (1965).

Primary Examiner—H.S. Cockeram
Attorney, Agent, or Firm—Ronald C. Hudgens; Philip R. Cloutier; James B. Wilkens

[57] ABSTRACT

Disclosed are polyurethane foam compositions comprising the reaction product of an organic polyisocyanate, a first polyol comprising an oxyalkylated Mannich reaction product of a phenol, an aldehyde, and an alkanol amine, a second polyol comprising an oxyalkylated pentaerythritol, and a third polyol comprising an oxyalkylated tetrabromophthalic anhydride.

7 Claims, No Drawings

FIRE RETARDANT POLYURETHANE FOAMS

This invention relates to polyurethanes.

More specifically, this invention relates to polyols employed to produce polyurethanes.

The methods of production and the uses of polyurethanes are well known. For example, foamed polyurethane compositions have found widespread use in the fields of insulation and structural reinforcement.

One factor limiting the commercial use of foamed polyurethanes is flammability.

The present invention provides a polyurethane composition which facilitates the production of rigid polyurethane foams which exhibit excellent fire retardancy.

According to this invention, there is provided a polyurethane composition comprising the reaction product of an isocyanate, a first polyol comprising an oxyalkylated Mannich reaction product of a phenol, an aldehyde, and an alkanol amine reacted to a hydroxyl number within the range of from about 350 to about 650, a second polyol comprising a pentaerythritol oxyalkylated to a hydroxyl number within the range of from about 350 to about 650 and a third polyol comprising an oxyalkylated tetrabromophthalic anhydride.

In the practice of this invention, other known materials, such as surfactants, catalysts, extenders, crosslinking agents, blowing agents, fillers, fire retardants, and pigments can be employed.

In a preferred embodiment, the polyurethane composition of this invention is foamed and will comprise at least one each of the following: surfactant, catalyst, blowing agent, crosslinking agent, and fire retardant.

In another preferred embodiment, the total amounts of the first, second and third polyols are simultaneously reacted with the total amount of the isocyanate. However, as an alternative, the polyols may be individually reacted with the isocyanate.

In the practice of this invention, the isocyanate will be employed in an amount within the range of from about 45 to about 60 parts per 100 parts by weight of the polyurethane composition. Any suitable isocyanate or reactive —NCO containing compound can be employed. Prepolymers having reactive isocyanate or —NCO groups can also be employed. A particularly suitable isocyanate is designated "Mondur MR", commercially available from Mobay Chemical Co. "Mondur MR" is a polymeric polyaryl-polyisocyanate prepared by phosgenation of aniline and formaldehyde in a mineral acid, the polyisocyanate having from about 31.5 to about 32% active —NCO groups and a Brookfield viscosity at 25° C. of about 200 cps.

In the practice of this invention, the first polyol will be employed in an amount within the range of from about 5 to about 10 parts per 100 parts by weight of the polyurethane composition.

A particularly suitable first polyol is designated by the trademark "Thanol", commercially available from Jefferson Chemical Co., Inc. "Thanol R-650-X" is particularly suitable for use.

"Thanol R-650-X" is the oxyalkylated Mannich reaction product of phenol, formaldehyde, and diethanol amine and has a hydroxyl number within the range of from about 440 to about 460.

In the practice of this invention, the second polyol will be employed in an amount within the range of from about 8 to about 13 parts per 100 parts by weight of the polyurethane composition.

A particularly suitable second polyol is designated by the trademark "Pluracol PeP 550", commercially available from BASF Wyandotte Corporation.

"Pluracol PeP 550" is the oxyalkylated reaction product of about 1 mole of pentaerythritol and about 6 moles of propylene oxide and has a hydroxyl number of about 448, a number average molecular weight of about 500 and a Brookfield viscosity at 25° C. of about 1400 cps.

Also suitable for use is "Pluracol PeP 450" which is the oxyalkylated reaction product of about 1 mole of pentaerythritol and about 4.5 moles of propylene oxide and has a hydroxyl number of about 560, a number average molecular weight of about 500 and a Brookfield viscosity at 25° C. of about 2500 cps.

In the practice of this invention, the third polyol will be employed in an amount within the range of from about 12 to about 17.5 parts per 100 parts by weight of the polyurethane composition.

A particularly suitable third polyol is designated "Pluracol 529" commercially available from BASF Wyandotte Corporation.

"Pluracol 529" is an oxyalkylated tetrabromophthalic anhydride having a hydroxyl number of about 290.

In the practice of this invention, any suitable blowing agent can be employed in an amount within the range of from about 8.5 to about 20 parts per 100 parts by weight of the polyurethane composition.

Suitable blowing agents include carbon dioxide, the fluorochlorocarbons and hydrocarbons which boil in the range of from about −30° to about 50° C., for example, trichlorofluoromethane, trichlorofluoroethane, dichloromonofluoromethane, monochloroethane, monochloromonofluoroethane, difluoromonochloroethane, difluorodichloroethane, pentane, and mixtures thereof. A particularly suitable blowing agent is trichlorofluoromethane, designated by the trademark "Freon 11B", commercially available from E. I. DuPont de Nemours & Co.

Any suitable surfactant can be employed. Preferably, the surfactant will be employed in a range within a total amount of from about 0.1 to about 1 part per 100 parts by weight of the polyurethane composition.

A particularly suitable surfactant is designated by the trademark "L-5420", commercially available from Union Carbide.

"L-5420" is a non-hydrolyzable silicone surfactant having a hydroxyl number of about 119 and a Brookfield viscosity at 25° C. of about 310 cps.

Another suitable surfactant is designated by the trademark "DC-193 Surfactant", commercially available from Dow Corning Corporation.

"DC-193 Surfactant" is a combination of dimethyl silicone with an adduct of ethylene oxide and propylene oxide, the adduct being hydroxyl terminated.

Any suitable catalyst can be employed to increase the rate of the isocyanate-polyol reaction. Preferably, catalyst will be employed in a total amount within the range of from about 0.01 to about 2.5 parts per 100 parts by weight of the polyurethane composition. Particularly suitable catalysts are dimethylethanolamine and a 33% solution of 1,4-diazobicyclo(2,2,2) octane in dipropylene glycol, designated "Dabco 33-LV", commercially available from the Houdry Division of Air Products and Chemicals, Inc.

Other suitable catalysts are designated "Dabco R-8020", also commercially available from the Houdry Division of Air Products and Chemicals Inc., "Carstan T-52N", commercially available from Cincinnati Milacron Chemicals Inc. and "Formrez UL-8", commercially available from Witco Chemical Co.

"Dabco R-8020" is a 20% triethylenediamine, 80% dimethylethanolamine solution.

"Carstan T-52N" is dibutyl tin bis isooctyl maleate.

"Formrex UL-8" is an organo tin compound having a specific gravity at 25° C. of from about 1,330 to about 1.350, a refractive index at 25° C. of from about 1.4975 to about 1.5075, a minimum tin content of about 22% and a molecular weight of about 490.

Any suitable crosslinking agent can be employed. Suitable crosslinking agents include most low viscosity, high hydroxyl number materials. Crosslinking agent will be employed in a total amount within the range of from about 3 to about 7.5 parts per 100 parts by weight of the polyurethane composition.

Particularly suitable crosslinking agents are ethylene glycol, diethylene glycol, propylene glycol and the like.

Any suitable fire retardant can be employed in a total amount within the range of from about 3 to about 12 parts per 100 parts by weight of the polyurethane foam formulation. Particularly suitable fire retardants are "Stauffer Fyrol 32B" and "Stauffer Fyrol CEF", both commercially available from Stauffer Chemical Co.

"Stauffer Fyrol 32B" is tris 2,3-dibromopropyl phosphate and "Stauffer Fyrol CEF" is tris 2-chloroethyl phosphate.

The rigid polyurethane composition of this invention is prepared by conventional methods such as described below, and is particularly well suited for spray application onto substrate surfaces prepared in the usual manner to accept paint.

Having described the materials of this invention, reference is now made to the following examples which are provided by way of illustration and not by way of limitation of the practices of the invention.

EXAMPLE I

This example demonstrates the best mode for the preparation of a polyurethane composition of the present invention.

| Ingredients | Parts per 100 parts by weight |
|---|---|
| "A" Component | |
| isocyanate - "Mondur MR" | 47.8 |
| fire retardant - "Stauffer Fyrol 32B" | 3.2 |
| "B" Component | |
| polyol - "Thanol R-650-X" | 7.5 |
| polyol - "Pluracol PeP 450" | 10.5 |
| polyol - "Pluracol 529" | 14.0 |
| surfactant - "DC-193 Surfactant" | 0.4 |
| crosslinking agents - "Ethylene glycol" | 2.0 |
| crosslinking agent - "Dipropylene glycol" | 2.0 |
| catalyst - "Stauffer Fyrol CEF" | 4.0 |
| blowing agent - "Freon 11B" | 9.5 |

Each component was mixed separately.

The total amounts of the "Mondur MR" and "Stauffer Fyrol 32B" were introduced into a mixing vessel, stirred for about 30 minutes and recovered as the "A" component.

The total amounts of all ingredients of the "B" component, except the "Formrez UL-8" and the "Freon 11B" were introduced into a mixing vessel and stirred for about 20 minutes. The total amount of "Freon 11B" was then introduced into the contents of the mixing vessel with stirring. Next, the total amount of "Formrez UL-8" was introduced into the contents of the mixing vessel with stirring and the contents of the mixing vessel were recovered as the "B" component.

The "A" component and "B" component were then spray applied, at an "A" Component/"B" Component ratio of 1 to 1 by volume, to a UL labeled ¼ inch thick asbestos-cement board (70° F.) and the resulting foam was found to have the following properties:

TABLE I

| Property | Foam of Example I |
|---|---|
| 1) Foam Density (pcf)* | 2.75 |
| 2) UL 723** | |
| (a)Flame spread | 25.6 |
| (b)Fuel contributed | 0 |
| (b)Smoke developed | 620 |

*ASTM D-1622-63
**Underwriters Laboratories Inc.'s standard test method for fire-hazard classification of building materials The above data show that a polyurethane composition according to the practice of this invention exhibits excellent fire retardancy and is eligible for an Underwriters Laboratories Inc. fire hazard classification (based on 100 for untreated red oak) as follows:

| Flame spread | 25 |
|---|---|
| Fuel contributed | 0 |
| Smoke developed | Over 500 |

It will be evident from the foregoing that various modifications can be made to the present invention. Such, however, are considered as being within the scope of the invention.

What is claimed is:

1. A polyurethane foam composition comprising the reaction product in the presence of a blowing agent of an organic polyisocyanate and, per 100 parts by weight of said composition, about 5 to 10 parts by weight of a first polyol comprising an oxyalkylated Mannich reaction product of a phenol, an aldehyde, and an alkanol amine reacted to a hydroxyl number within the range of from about 350 to about 650, about 8 to 13 parts by weight of a second polyol comprising a pentaerythritol oxyalkylated to a hydroxyl number within the range of from about 350 to about 650 and about 12 to 17.5 parts by weight of a third polyol comprising an oxyalkylated tetrabromophthalic anhydride.

2. The polyurethane foam composition of claim 1 wherein said polyisocyanate is employed in an amount of from about 45 to about 60 parts by weight, per 100 parts by weight of said composition.

3. The polyurethane foam composition of claim 2 wherein about 8.5 to about 20 parts by weight of said blowing agent is employed per 100 parts by weight of said composition.

4. The polyurethane foam composition of claim 2 also comprising in parts per 100 parts by weight of the polyurethane composition a surfactant in an amount within the range of from about 0.1 to about 1 part.

5. The polyurethane foam composition of claim 2 also comprising in parts per 100 parts by weight of the polyurethane composition a catalyst in an amount within the range of from about 0.01 to about 2.5 parts.

6. The polyurethane foam composition of claim 2 also comprising in parts per 100 parts by weight of the polyurethane composition, a fire retardant in an amount within the range of from about 3 to about 12 parts.

7. The polyurethane foam composition of claim 2 also comprising in parts per 100 parts by weight of the polyurethane composition a crosslinking agent in an amount within the range of from about 3 to about 7.5 parts.

* * * * *